United States Patent
Fischer et al.

(10) Patent No.: US 12,496,394 B2
(45) Date of Patent: Dec. 16, 2025

(54) SYSTEMS AND METHODS FOR OCCLUSION DETECTION IN INFUSION PUMPS

(71) Applicants: Baxter International Inc., Deerfield, IL (US); Baxter Healthcare SA, Glattpark (CH)

(72) Inventors: Steven Ward Fischer, Gurnee, IL (US); Ye Chen, Lake Forest, IL (US)

(73) Assignees: Baxter International Inc., Deerfield, IL (US); Baxter Healthcare SA, Glattpark (CH)

( * ) Notice: Subject to any disclaimer, the term of this patent is extended or adjusted under 35 U.S.C. 154(b) by 964 days.

(21) Appl. No.: 17/565,812

(22) Filed: Dec. 30, 2021

(65) Prior Publication Data

US 2022/0203026 A1 Jun. 30, 2022

Related U.S. Application Data

(60) Provisional application No. 63/132,183, filed on Dec. 30, 2020.

(51) Int. Cl.
*A61M 5/168* (2006.01)
*A61M 5/142* (2006.01)

(52) U.S. Cl.
CPC ........ *A61M 5/16831* (2013.01); *A61M 5/142* (2013.01); *A61M 2205/18* (2013.01); *A61M 2205/332* (2013.01); *A61M 2205/502* (2013.01); *A61M 2205/52* (2013.01)

(58) Field of Classification Search
CPC .............. A61M 5/142; A61M 5/16831; A61M 2005/16863; A61M 2205/52; A61M 2205/502; A61M 2205/332; A61M 2205/18; G16H 50/20; G16H 20/17; G16H 40/40

See application file for complete search history.

(56) References Cited

U.S. PATENT DOCUMENTS 10,792,420 B2 * 10/2020 Carothers .............. G16H 40/40

* cited by examiner

*Primary Examiner* — An H Do
(74) *Attorney, Agent, or Firm* — K&L Gates LLP

(57) ABSTRACT

Systems and methods for detecting an occlusion in an infusion device are disclosed. One method includes generating, during an infusion session at predetermined intervals, a feature vector including an initial measurement of a physical force caused by fluid motion through an infusion device at the start of an infusion session, a current measurement of the physical force, a long term change in the measurement of the physical force, and a short term change in the measurement of the physical force. The feature vector is inputted, during the predetermined intervals, into a support vector machine ("SVM") to output an indication of a presence or an absence of an occlusion in the infusion device. The SVM may be trained using reference data from reference infusion sessions having known consequences regarding the presence or the absence of an occlusion at various times during the reference infusion sessions.

18 Claims, 9 Drawing Sheets

$$X[i,j] = \begin{bmatrix} X_{11} & X_{12} & X_{13} & X_{14} & X_{15} \\ \vdots & & \vdots & & \vdots \\ X_{n1} & X_{n2} & X_{n3} & X_{n4} & X_{n5} \end{bmatrix}$$

$X_{i,1}$ (ADC), $X_{i,2}$ (Load ADC), $X_{i,3}$ (Flow Rate), $X_{i,4}$ (One-minute Slope), $X_{i,5}$ (50ms Slope)

FIG. 3

$$y = \begin{Bmatrix} y_1 \\ y_2 \\ \vdots \\ y_n \end{Bmatrix}$$

FIG. 4

SYSTEMS AND METHODS FOR OCCLUSION DETECTION IN INFUSION PUMPS

PRIORITY CLAIM

This application claims priority to and the benefit as a non-provisional application of U.S. Provisional Patent Application No. 63/132,183, filed Dec. 30, 2020, the entire contents of which are hereby incorporated by reference and relied upon.

BACKGROUND

Generally, medical patients sometimes require precise intravenous ("IV") delivery of either continuous medication or medication at set periodic intervals using infusion pumps. Known infusion pumps provide controlled fluid medication or drug infusion where the fluid can be administered at a precise rate that keeps a medication/drug concentration within a therapeutic margin and out of an unnecessary or possibly toxic range. The infusion pumps provide appropriate medication/drug delivery to a patient at a controllable rate, which does not require frequent attention.

Infusion pumps may facilitate administration of intravenous therapy to patients both in and outside of a clinical setting. Outside a clinical setting, doctors have found that in many instances patients can return to substantially normal lives, provided that they receive periodic or continuous intravenous administration of medication, drugs, or other fluids such as saline. Among the types of therapies requiring this kind of administration are antibiotic therapy, chemotherapy, pain control therapy, nutritional therapy, and several other types that are known by those skilled in the art. In many cases, patients receive multiple daily therapies. Certain medical conditions require infusion of drugs in a solution over relatively short periods such as from thirty minutes to two hours. These conditions and others have collectively promoted the development of increasingly lightweight, portable or ambulatory infusion pumps that can be worn by a patient and are capable of administering a continuous supply of medication at a desired rate, or providing several doses of medication at scheduled intervals.

Known infusion pumps include elastomeric pumps, which squeeze solution from flexible containers, such as balloons, into IV tubing for delivery to a patient. Alternatively, infusion pumps may include spring-loaded pumps that pressurize solution containers or reservoirs. Certain pump designs utilize cartridges containing flexible compartments that are squeezed by pressure rollers for discharging the solutions. Further, known infusion pumps include peristaltic pumps having finger actuators or a roller actuator that apply pressure to IV tubing for delivering fluid from a fluid container to a patient.

Infusion pumps utilizing syringes are also known. These syringe pumps use a drive mechanism to move a plunger of a syringe to deliver a fluid to a patient. Typically, these infusion pumps include a housing adapted to receive a syringe assembly, a drive mechanism adapted to move the syringe plunger, and a pump control unit having a variety of operating controls.

In order to ensure a safe and effective operation of an infusion system, infusion pumps may need to be monitored for risk of an occlusion. An occlusion involves any blockage or a closing of IV tubing connected to an infusion pump, which may thereby restrict the flow of fluid to a patient. An occlusion can occur for a variety of reasons, including, but not limited to, unintended pressure applied to a pump, a bending of IV tubing, and/or clogging caused by particles within a fluid.

Conventional methods for occlusion detection use a force sensor to detect an in-line IV tubing pressure. These force sensor measurements indirectly indicate an occlusion when the in-line pressure reaches or exceeds a threshold. For example, IV tubing may be placed into a tube channel of an infusion pump. The IV tubing may be pressed up against a force sensor using a cover of the infusion pump. This compressive force from the cover may be similar in magnitude to a pressure caused by an occlusion, which may cause the force sensor to transmit force measurements that are incorrectly interpreted as an occlusion being present. The force applied by the cover must therefore be removed from the force sensor output to properly assess the fluid pressure within the IV tubing. However, external factors, such as a height of the intravenous connection to a patient and characteristics of various devices associated with the infusion pump (e.g., a fluid container, a pumping chamber, the IV tubing, etc.) can also influence measurements by the force sensor, thereby affecting the reliability of using the force sensor to determine an occlusion status. In addition, the IV tubing that was originally pressed up against the force sensor may gradually relax over time within the confined tube channel of the infusion pump. This can reduce the pressure measured by the force sensor, which further affects the reliability of this approach for occlusion detection.

One way to overcome or minimize the influence of these external factors is by calculating a force baseline. Such a force baseline may be captured prior to or during the start of an infusion. The force baseline can be subtracted from the measured force to provide a more accurate reading of the forces within the tube itself. The problem with this approach is that these external factors can change over time, so the force baseline may also need to be adjusted to account for the changing external factors. However, adjustments to the force baseline may not be in synchronization with the changes in the external factors. Further, the tools used to make these adjustments may often have difficulty distinguishing changes in the external factors from changes in pressure of the IV tubing. This lag in adjusting the force baseline often leads to false occlusion detection.

Accordingly, a more accurate and reliable method and system for detecting occlusions in infusion pumps is desired.

SUMMARY

The present disclosure provides a new and innovative method and system for occlusion detection using artificial intelligence. In various embodiments, the device in which occlusion can be detected is an infusion pump. The infusion pump in various embodiments is a peristaltic pump, a syringe pump, or an ambulatory pump configured to deliver a medication to a patient. It should be appreciated that the device is, in various embodiments, any type of medical device, or any other suitable device where detecting any occlusion occurring within the device is crucial for its safe and effective operation.

The disclosed method includes steps to precondition input data from infusion pump pressure samples, steps to train a machine learning model (e.g., a support vector machine) using preconditioned data from reference infusion pump pressure samples, and applying the trained machine learning model to preconditioned input data from an infusion session to detect occlusions in real-time. The preconditioning steps involve receiving one or more types of input data, including, but not limited to (1) a current measurement of a physical force (e.g., a force and/or a pressure detected by a force sensor) within a periodic infusion sample, (2) an initial measurement of the physical force at the start of an infusion (e.g., a reference or baseline force), (3) a metric to represent a long term history of the physical force (e.g., a slope value represented by the current measurement of the physical force over a measurement of the physical force at a distant past), and (4) a metric to represent a short term history of the physical force (e.g., a slope value represented by the current measurement of the physical force over a measurement of the physical force at a near past). The use of different types of input data enable the disclosed machine learning model to differentiate between slowly changing forces, such as tube settling and faster changing forces such as occlusions. Furthermore, the preconditioning steps enable the machine learning model to ideally find statistically significant differences that denote an occlusion scenario over a non-occlusion scenario.

The training of the machine learning model may include receiving a training data set comprising the above described input data (e.g., (1) a current measurement of a physical force, (2) an initial measurement of the physical force at the start of an infusion, (3) a metric to represent a long term history of the physical force, and (4) a metric to represent the short term history of the physical force) for reference infusion events with a known output (e.g., an occlusion or an absence of an occlusion). The received input data set may be arranged as input vectors and associated with their corresponding outputs. For example, a training data set of X, may comprise N input vectors, $x_1, \ldots, x_N$, with corresponding target values $y_1, y_N$, where $y_n \in \{-1, 1\}$. If a given data sample represented by a given input vector, $x_n$, did not involve an occlusion, the given input vector may be associated with an output, $y=-1$. Conversely, if a given data sample represented by a given input vector, $x_n$, involved an occlusion, the given input vector may be associated with an output, $y=1$.

Given the nature of the occlusion detection in the infusion system, a Support Vector Machine ("SVM") may be used to train the machine learning model. Thus, data sets may be classified into the two groups (e.g., occlusion and no occlusion) and a decision boundary with an optimal boundary may be determined (e.g., that optimizes the margin between occluded and un-occluded data). The parameters for the optimal decision boundary for the training data set may be stored for use during infusion treatments.

The trained machine learning model may be subsequently utilized with a new sample dataset in order to detect when an occlusion occurs. For example, as an infusion pump is configured for a treatment, and force sensors begin measuring physical forces, new values for the above described types of input data are obtained (e.g., (1) a current measurement of a physical force, (2) an initial measurement of the physical force at the start of an infusion, (3) a metric to represent a long term history of the physical force, and (4) a metric to represent the short term history of the physical force). Input vectors may be formed using the input data, and then inputted into the trained machine learning algorithm to determine whether an occlusion has occurred.

In light of the disclosure herein and without limiting the disclosure in any way, in a first aspect of the present disclosure, which may be combined with any other aspect listed herein unless specified otherwise, an infusion pump apparatus for detecting an occlusion includes intravenous ("IV") tubing having a first end that is fluidly coupled to a patient and a second end that is fluidly coupled to a container, a pumping mechanism operable with a portion of the IV tubing for providing controlled delivery of a fluid from the container to the patient, a force sensor coupled to the IV tubing to measure a physical force caused by the fluid, one or more processors, and a memory storing instructions. When executed by the one or more processors, the instructions cause the one or more processors to receive, via the force sensor and during a start of an infusion session, an initial measurement of a physical force caused by fluid motion through the IV tubing, and identify, based on one or more parameters associated with the infusion session, a trained support vector machine for occlusion detection. The one or more processors are also configured to generate, during the infusion session at predetermined intervals, a feature vector comprising the initial measurement of the physical force measured by the force sensor, a current measurement of the physical force measured by the force sensor, a long term change in the measurement of the physical force, and a short term change in the measurement of the physical force. The one or more processors are further configured to input, during the infusion session at the predetermined intervals, the feature vector into the trained support vector machine to output a detection of a presence or an absence of an occlusion in the IV tubing and when the presence of the occlusion is detected, pause or terminate the infusion session.

In accordance with a second aspect of the present disclosure, which may be used in combination with any other aspect listed herein unless stated otherwise, generating the feature vector further comprises receiving, via the force sensor, a current measurement of the physical force, determining, based on a first prior measurement of the physical force, a long term change in the measurement of the physical force, and determining, based on a second prior measurement of the physical force, a short term change in the measurement of the physical force.

In accordance with a third aspect of the present disclosure, which may be used in combination with any other aspect listed herein unless stated otherwise, the instructions, when executed, further cause the one or more processors to train the support vector machine using a training dataset from a plurality of reference infusion sessions sharing the one or more parameters of the infusion session.

In accordance with a fourth aspect of the present disclosure, which may be used in combination with any other aspect listed herein unless stated otherwise, training the support vector machine further comprises receiving, for each of the plurality of reference infusion sessions one or more reference feature vectors corresponding to one or more times during the respective infusion session, wherein a given reference feature vector comprises a reference initial measurement of the physical force at the start of the respective reference infusion session, a reference current measurement of the physical force at a given time of the one or more times during the reference infusion session, a reference long term change in the measurement of the physical force, and a reference short term change in the measurement of the physical force. An indication of a presence or an absence of an occlusion at the one or more times during the respective infusion session is also received. Training the support vector machine also comprises associating, for each of the plurality of reference infusion sessions, the one or more feature vectors with either the indication of the presence of the occlusion or the indication of the absence of the occlusion, determining, based on an optimized margin, a decision boundary for the training dataset, wherein the decision boundary divides the reference feature vectors associated with the indication of the presence of the occlusion from the reference feature vectors associated with the indication of the absence of the occlusion, and generating, based on the decision boundary, the trained support vector machine.

In accordance with a fifth aspect of the present disclosure, which may be used in combination with any other aspect listed herein unless stated otherwise, the long term change in the measurement of the physical force includes a slope value represented by the current measurement of the physical force over a measurement of the physical force at a distant past.

In accordance with a sixth aspect of the present disclosure, which may be used in combination with any other aspect listed herein unless stated otherwise, the distant past includes one or more measurements of the physical force recorded at one to two minutes previously.

In accordance with a seventh aspect of the present disclosure, which may be used in combination with any other aspect listed herein unless stated otherwise, the long term change in the measurement of the physical force includes a slope value that is equal to the current measurement of the physical force minus a measurement of the physical force at a distant past, divided by a number of measurements recorded between the current measurement of the physical force and the measurement of the physical force at the distant past.

In accordance with an eighth aspect of the present disclosure, which may be used in combination with any other aspect listed herein unless stated otherwise, the distant past includes one or more measurements of the physical force recorded at one to two minutes previously.

In accordance with a ninth aspect of the present disclosure, which may be used in combination with any other aspect listed herein unless stated otherwise, the short term change in the measurement of the physical force includes a slope value represented by the current measurement of the physical force over a measurement of the physical force at a near past.

In accordance with a tenth aspect of the present disclosure, which may be used in combination with any other aspect listed herein unless stated otherwise, the near past includes one or more measurements of the physical force recorded at 50 milliseconds to 100 milliseconds previously.

In accordance with an eleventh aspect of the present disclosure, which may be used in combination with any other aspect listed herein unless stated otherwise, the short term change in the measurement of the physical force includes a slope value that is equal to the current measurement of the physical force minus a measurement of the physical force at a near past, divided by a number of measurements recorded between the current measurement of the physical force and the measurement of the physical force at the near past.

In accordance with a twelfth aspect of the present disclosure, which may be used in combination with any other aspect listed herein unless stated otherwise, the near past includes one or more measurements of the physical force recorded at 50 milliseconds to 100 milliseconds previously.

In accordance with a thirteenth aspect of the present disclosure, which may be used in combination with any other aspect listed herein unless stated otherwise, the one or more processors are configured to cause an alert or an alarm to be displayed on a user interface when the presence of the occlusion is detected.

In accordance with a fourteenth aspect of the present disclosure, which may be used in combination with any other aspect listed herein unless stated otherwise, an infusion system for detecting an occlusion includes a force sensor coupled to IV tubing to measure a physical force caused by a fluid within the IV tubing, the IV tubing having a first end that is fluidly coupled to a patient and a second end that is fluidly coupled to a container. The system also includes an infusion device communicatively coupled to the force sensor. The infusion device includes a pumping mechanism operable with a portion of the IV tubing for providing controlled delivery of a fluid from the container to the patient, a user interface, one or more processors, and a memory storing a plurality of trained support vector machines and instructions that, when executed by the one or more processors, cause the one or more processors to receive, via the force sensor and during a start of an infusion session, an initial measurement of a physical force caused by fluid motion through the IV tubing and identify, based on one or more parameters associated with the infusion session, a trained support vector machine for occlusion detection among the plurality of the trained support vector machines. The one or more processors are also configured to generate, during the infusion session at predetermined intervals, a feature vector comprising the initial measurement of the physical force measured by the force sensor, a current measurement of the physical force measured by the force sensor, a long term change in the measurement of the physical force, and a short term change in the measurement of the physical force. The one or more processors are further configured to input, during the infusion session at the predetermined intervals, the feature vector into the trained support vector machine to output a detection of a presence or an absence of an occlusion in the IV tubing and when the presence of the occlusion is detected, cause an alert or an alarm to be displayed on the user interface that is indicative of the occlusion.

In accordance with a fifteenth aspect of the present disclosure, which may be used in combination with any other aspect listed herein unless stated otherwise, the one or more processors are configured to pause or terminate the infusion session when the presence of the occlusion is detected.

In accordance with a sixteenth aspect of the present disclosure, which may be used in combination with any other aspect listed herein unless stated otherwise, the force sensor is integrally formed or fluidly connected to the IV tubing.

In accordance with a seventeenth aspect of the present disclosure, which may be used in combination with any other aspect listed herein unless stated otherwise, generating the feature vector further comprises receiving, via the force sensor, a current measurement of the physical force, determining, based on a first prior measurement of the physical force, a long term change in the measurement of the physical force, and determining, based on a second prior measurement of the physical force, a short term change in the measurement of the physical force.

In accordance with an eighteenth aspect of the present disclosure, which may be used in combination with any other aspect listed herein unless stated otherwise, the instructions, when executed, further cause the one or more processors to train the support vector machine using a training dataset from a plurality of reference infusion sessions sharing the one or more parameters of the infusion session.

In accordance with a nineteenth aspect of the present disclosure, which may be used in combination with any other aspect listed herein unless stated otherwise, training the support vector machine further comprises receiving, for each of the plurality of reference infusion sessions one or more reference feature vectors corresponding to one or more times during the respective infusion session, wherein a given reference feature vector comprises a reference initial measurement of the physical force at the start of the respective reference infusion session, a reference current measurement of the physical force at a given time of the one or more times during the reference infusion session, a reference long term change in the measurement of the physical force, and a reference short term change in the measurement of the physical force. An indication of a presence or an absence of an occlusion at the one or more times during the respective infusion session is also received. Training the support vector machine also comprises associating, for each of the plurality of reference infusion sessions, the one or more feature vectors with either the indication of the presence of the occlusion or the indication of the absence of the occlusion, determining, based on an optimized margin, a decision boundary for the training dataset, wherein the decision boundary divides the reference feature vectors associated with the indication of the presence of the occlusion from the reference feature vectors associated with the indication of the absence of the occlusion, and generating, based on the decision boundary, the trained support vector machine.

In accordance with a twentieth aspect of the present disclosure, which may be used in combination with any other aspect listed herein unless stated otherwise, an infusion pump method for detecting an occlusion includes receiving, in a processor of an infusion device from a force sensor and during a start of an infusion session, an initial measurement of a physical force caused by fluid motion through IV tubing having a first end that is fluidly coupled to a patient and a second end that is fluidly coupled to a container and identifying, via the processor based on one or more parameters associated with the infusion session, a trained support vector machine for occlusion detection. The method also includes generating, via the processor during the infusion session at predetermined intervals, a feature vector comprising the initial measurement of the physical force measured by the force sensor, a current measurement of the physical force measured by the force sensor, a long term change in the measurement of the physical force, and a short term change in the measurement of the physical force. The method further includes inputting, via the processor during the infusion session at the predetermined intervals, the feature vector into the trained support vector machine to output a detection of a presence or an absence of an occlusion in the IV tubing and when the presence of the occlusion is detected, pausing or terminating the infusion session via the processor.

In accordance with a twenty-first aspect of the present disclosure, any of the structure, functionality, and alternatives disclosed in connection with any one or more of FIGS. 1 to 9 may be combined with any other structure, functionality, and alternatives disclosed in connection with any other one or more of FIGS. 1 to 9.

In light of the present disclosure and the above aspects, it is therefore an advantage of the present disclosure to provide an infusion system configured to detect occlusions while compensating for long and short term variations within IV tubing or the infusion system.

It is another advantage of the present disclosure to train and use support vector machines for detecting occlusions in IV tubing.

Additional features and advantages are described in, and will be apparent from, the following Detailed Description and the Figures. The features and advantages described herein are not all-inclusive and, in particular, many additional features and advantages will be apparent to one of ordinary skill in the art in view of the figures and description. Also, any particular embodiment does not have to have all of the advantages listed herein and it is expressly contemplated to claim individual advantageous embodiments separately. Moreover, it should be noted that the language used in the specification has been selected principally for readability and instructional purposes, and not to limit the scope of the inventive subject matter.

BRIEF DESCRIPTION OF THE DRAWINGS

FIG. 3 is a matrix showing an example occlusion training dataset, according to an embodiment of the present disclosure.

FIG. 4 is a vector showing an example target value for the example occlusion training dataset, according to an example embodiment of the present disclosure.

DETAILED DESCRIPTION

Figure 1:
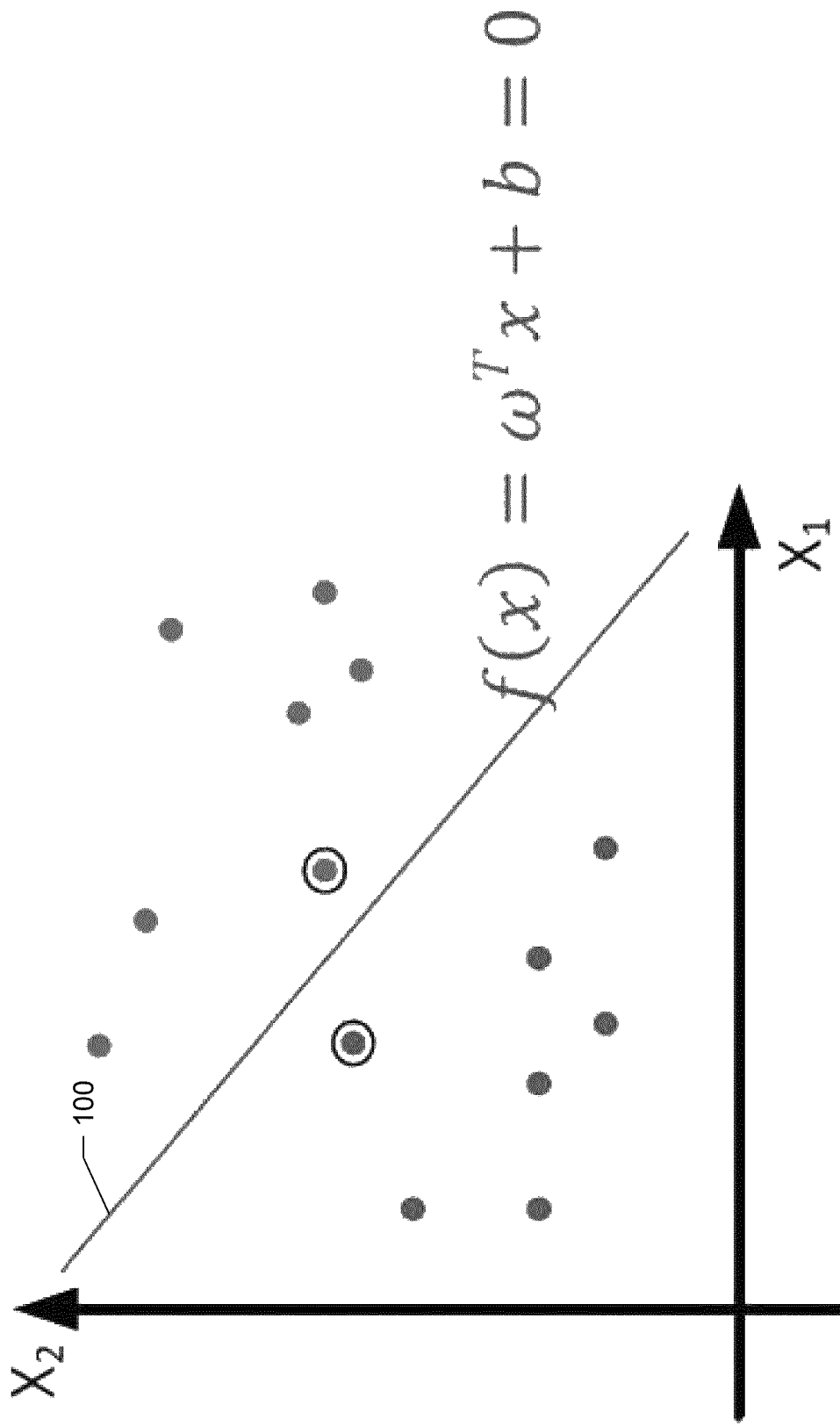
FIG. 1 is a graph illustrating an example two-class classification for occlusion detection, according to an embodiment of the present disclosure.

In-line occlusion detection is critical for the safe and effective operation of infusion systems. The most common method for occlusion detection utilizes a force sensor to detect in-line pressure (e.g., a pressure caused by fluid within a IV tubing coupled to an infusion device). The detected in-line pressure can indirectly indicate an occlusion status (e.g., a presence or an absence of an occlusion), based on whether or not the detected in-line pressure reaches or exceeds a preset threshold. However, false alarms of occlusion can occur for a variety of factors, including, but not limited to, variations in infusion systems and variations regarding the patient. The present disclosure provides more robust, accurate, and/or reliable systems and methods for occlusion detection in infusion systems. Furthermore, the present disclosure includes novel and nonobvious systems and methods for preconditioning data, and using particular artificial intelligence models (e.g., support vector machines) specifically suited to detect upstream and downstream occlusions which take place in the infusion systems.

Some embodiments for occlusion detection in infusion systems may include various parts, namely, preconditioning input data, training a machine learning model for occlusion detection, and applying the machine learning model. In the following paragraphs, these parts will be discussed with more detail.

A method for preconditioning input data may begin by receiving data from a force sensor. As previously discussed, a force sensor may be coupled to IV tubing of an infusion device to measure a physical force caused by fluid within the tubing. The fluid is delivered by an infusion device for infusion into a patient. In some embodiments, measurements of physical forces from the force sensor may be periodically sampled (e.g., measurements may be obtained in predetermined intervals of time). These sampled measurement readings may be fed into the occlusion detection models that are further described herein. Furthermore, these samples may be buffered, averaged, accumulated, and/or counted (e.g., preconditioned) to determine a baseline measurement of the physical force and a threshold value for the physical force. For example, data received from the force sensors may be preconditioned to represent:

(A) a current measurement of a physical force at periodic intervals;
(B) an initial reference at the start of the infusion—the intent is to provide the algorithm with a pump-to-pump, setup-to-setup, reference for an infusion treatment;
(C) an indicator of a long-term change in the physical force (e.g., to provide the machine learning model an indicia of the physical force over a long enough period to make significant rises or falls in the physical force obvious); and
(D) an indicator of a short-term change in the physical force (e.g., to provide the machine learning model an indicia of the current progress of the physical force (e.g., how fast the physical force is rising or falling).

The input for "(A)" may be a measurement of the physical force as part of the periodic sampling in real time.

The input for "(B)" may be a measurement of the physical force at the start of the infusion session.

The inputs for "(C)" and "(D)" may comprise the slopes in the current measurement of the physical force and the measurement of the physical force sometime in the past. Slopes may be used, for example, to provide for easily calculated values, which minimize the amount of information that needs to be stored in the infusion system and/or infusion device (e.g., at the microcontroller, memory, and/or electronic storage device).

For the input for "(C)", a measurement of a physical force 1-2 minutes in the past may be held and used to calculate a slope with the current measurement of the physical force. In other embodiments, the input for (C) may use a measurement of a physical force that is between thirty seconds to ten minutes in the past. In an example, the input (C) may be computed as:

$$Slope_{1MIN} = (X_{CURRENT} - X_{1MINREF})/12000,$$

where $X_{CURRENT}$ is the current measurement of the physical force and $X_{1MINREF}$ is the measurement of the physical force from 1 to 2 minutes in the past. The difference may be divided by a value (e.g., 12000) to represent the number of samples taken in 1 minute at a 5 millisecond ("ms") sample rate of the force sensors (e.g., an interval rate).

For "(D)", a sample measurement of physical force 50-100 ms in the past may be held and used to calculate a slope with the current sample measurement of the physical force. Thus, the input (D) may be computed as:

$$Slope_{50MS} = (X_{CURRENT} - X_{50MSREF})/10,$$

where $X_{CURRENT}$ is the current ADC sample and $X_{50MSREF}$ is the reference ADC sample from 50 to 100 milliseconds in the past. The 10 value may represent the number of samples taken in 50 ms at the 5 ms sample rate of the force sensors. In other embodiments, the input for (D) may use a measurement of a physical force that is between 1 ms to 5 seconds in the past.

The preconditioned inputs representing a long-term and a short-term change in the physical force (e.g., via slope information) provides the machine learning model information which could help it differentiate between slowly changing forces, such as tube settling, and faster changing forces, such as occlusions. Although it is understood that not all occlusion pressure changes occur quickly, providing the machine learning model at least two such above described inputs that capture the changes in the physical force may allow the machine learning model to find statistically significant differences that denote an occlusion scenario over a non-occlusion scenario. Furthermore, the two above described inputs capturing changes in the physical force can also be used to detect a scenario where IV tubing (e.g., an infusion passageway) may be occluded prior to starting an infusion session or treatment.

FIG. 1 is a graph illustrating an example two-class classification for occlusion detection, according to an embodiment of the present disclosure. A support vector machine ("SVM") is an example of a machine learning tool that can be customized and applied for occlusion detection, given the nature of occlusion detection in infusion systems. As can be seen in FIG. 1, a decision boundary 100 is chosen to be the one for which the margin is maximized. The linear model form for the decision boundary can be expressed as the following equation:

$$f(x) = \omega^T x + b = 0,$$

where X is the training occlusion data set comprising N input vectors $x_1, \ldots, x_N$, with corresponding target values $y_1, \ldots, y_N$, where $y_n \in \{-1, 1\}$. Occlusion and non-occlusion are represented in $y_n$ by 1 and −1, respectively. The parameters $\omega$ and b are chosen such that formula 1 satisfies $f(x_n) > 0$ for points having $y_n = 1$ and $f(x_n) < 0$ for points having $y_n = -1$. The support vectors are the vectors having closest distance to the decision boundary 100 in FIG. 1.

Figure 2:
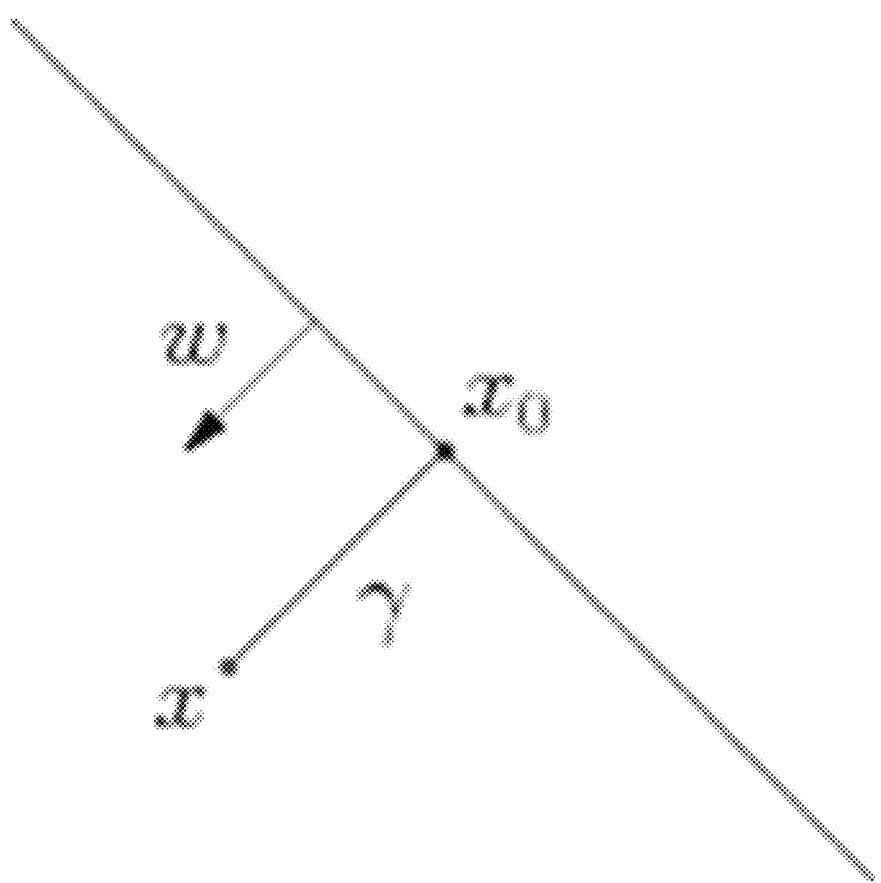
FIG. 2 is a graph illustrating a maximum margin classifier, according to an embodiment of the present disclosure.

FIG. 2 is a graph illustrating a maximum margin classifier. As shown in FIG. 2, to optimize the margin between occluded and un-occluded data and further derive $\omega$, the distance between the support vector x and the decision boundary is maximized. The optimization problem may involve a minimization of $\|\omega\|$, which can be accomplished via the following equation:

$$\gamma = \frac{\omega^T x + b}{\|\omega\|},$$

where $\Upsilon$ is the distance between the support vector x and the decision boundary.

A transformed optimization problem may be represented as the following equation:

$$\arg\min_{\omega,b} \frac{1}{2}\|\omega\|^2 \text{ s.t., } y_i(\omega^T x_i + b) \geq 1, i = 1, \ldots, n$$

In order to solve this constrained optimization problem, a Lagrange duality method as shown below, may be utilized:

$$L(\omega, b, \alpha) = \frac{1}{2}\|\omega\|^2 - \sum_{i=1}^{n} \alpha_i(y_i(\omega^T x_i + b) - 1),$$

where $\alpha_n$ comprise Lagrange multipliers that satisfies $\alpha_n \geq 0$. Further, by setting the partial derivatives of $L(\omega, b, \alpha)$ with respect to $\omega$ and b equal to zero, $\omega$ and b can be eliminated from $L(\omega, b, \alpha)$ to give the dual representation of the maximum margin problem, in which maximized $\alpha$ as can expressed as:

$$\frac{\partial L}{\partial \omega} = 0 \rightarrow \omega = \sum_{i=1}^{n} \alpha_i y_i x_i \text{ and } \frac{\partial L}{\partial b} = 0 \rightarrow b = \sum_{i=1}^{n} \alpha_i y_i = 0.$$

Incorporating the above formula into the formula for the Lagrange duality method may yield:

$$\max_{\alpha} \sum_{i=1}^{n} \alpha_i - \frac{1}{2} \sum_{i,j=1}^{n} \alpha_i \alpha_j y_i y_j x_i^T x_j$$

$$\text{s.t, } \alpha_i \geq 0, i = 1, \ldots, n$$

$$\sum_{i=1}^{n} \alpha_i y_i = 0$$

The aforementioned method may be used to solve a linear classification problem. In order to build a robust occlusion algorithm, a non-linear occlusion dataset may be assumed to be present. Then, a kernel function can be introduced herein to map the current occlusion data to higher dimensions in order to determine the decision boundary. The following formula may be used to introduce the kernel function K to replace $x_i^T X_j$ in the aforementioned method:

$$\max_{\alpha} \sum_{i=1}^{n} \alpha_i - \frac{1}{2} \sum_{i,j=1}^{n} \alpha_i \alpha_j y_i y_j \kappa(x_i, x_j),$$

where a kernel function can be polynomial, linear, and Gaussian functions as expressed below:

Polynomial $\kappa(x_1, x_2) = (\langle x_1, x_2 \rangle + R)^d$, R and d are mapping parameters Linear: $\kappa(x_1, x_2) = \langle x_1, x_2 \rangle$ Gaussian: $\kappa(x_1, x_2) = \exp\left(-\frac{\|x_1 - x_2\|^2}{2\sigma^2}\right)$, $\sigma$ is the attenuation parameter For ease of explanation, a linear kernel function is utilized in the foregoing sections to demonstrate the various embodiments described herein.

FIG. 3 is a matrix showing an example occlusion detection training dataset, according to an embodiment of the present disclosure. As previously discussed, a support vector machine ("SVM") can be utilized to build a customized model for occlusion detection. The occlusion detection training dataset, x, is a matrix that comprises N input vectors $x_1, \ldots, x_N$, and can represent occlusion related parameters, such as ADC counts, slopes, flowrates, current drain, temperature, etc. As can be seen in FIG. 3, a five parameters have been chosen for vectors X for demonstration purposes: a current measurement of an ADC count, a load ADC count, a flow rate, a long term change in the measurement of a physical force (e.g., a one minute slope), and a long term change in the measurement of a physical force (e.g., a 50 ms slope). In the example occlusion detection training dataset shown in FIG. 3, a five-dimension dataset is chosen for the training. The five-dimensional dataset may also be used for the application of the trained model. As previously discussed, parameters may also or alternatively include, for example, a current measurement of a physical force at periodic intervals, an initial measurement of the physical force (e.g., at the start of an infusion session), an indicator of a long term change in the measurement of the physical force, an indicator of a short term change in the measurement of the physical force, etc. Thus, based on the numbers of parameters being used, the dimensionality of a dataset may correspond accordingly.

Figure 4:
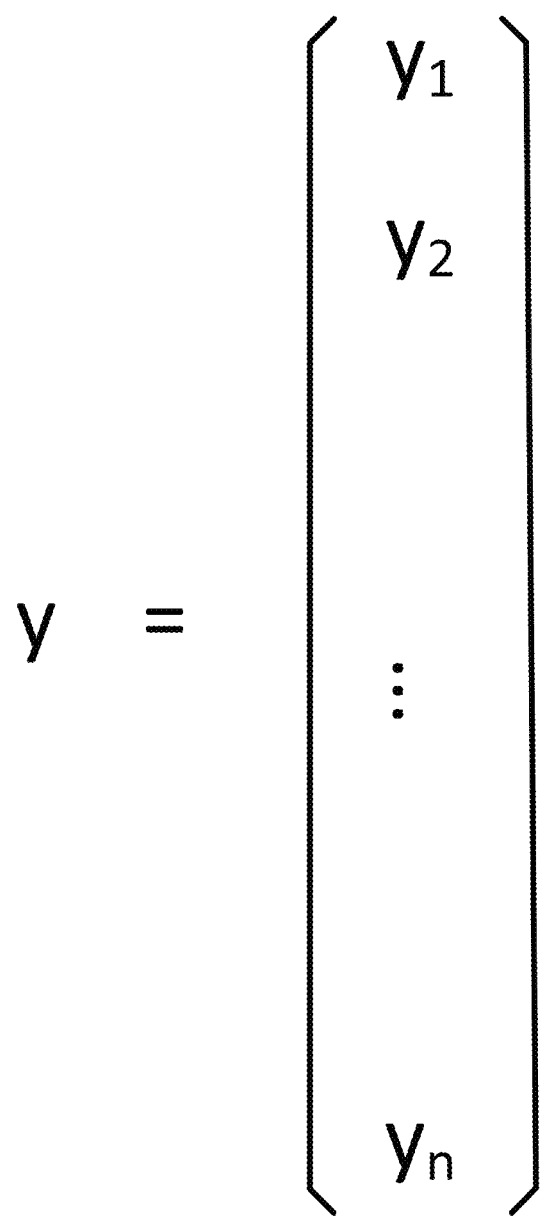

FIG. 4 is a vector showing example target values for the example occlusion training dataset of FIG. 3, according to an example embodiment of the present disclosure. In order to facilitate supervised machine learning, a training dataset may have known target values indicating whether an occlusion was present. Thus, each target value in the vector shown in FIG. 4 corresponds to a five-dimensional feature vector in FIG. 3.

Figure 5:
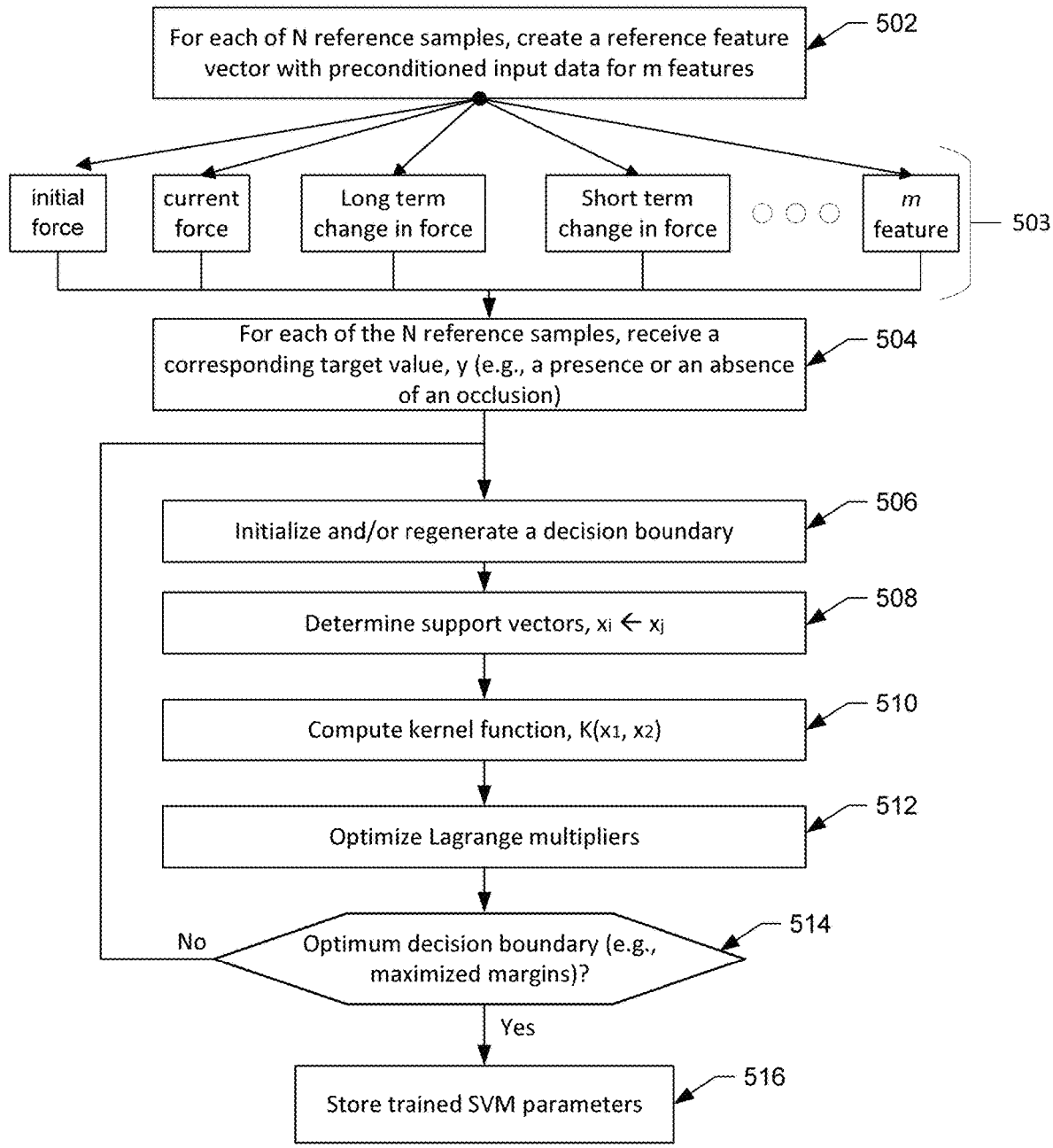
FIG. 5 is a flow chart illustrating a method for training a model for occlusion detection, according to an embodiment of the present disclosure.

FIG. 5 is a flow chart illustrating a method for training a model for occlusion detection, according to an embodiment of the present disclosure. The method may be performed by one or more processors associated with an infusion system. The method may be performed after preconditioning input data received from the force sensor associated with the input system. The training may involve an occlusion detection training dataset (e.g., as shown in FIGS. 3 and 4) obtained from a plurality of reference samples. The reference sample may be from various patients, past data, external libraries or databases, etc.

At step 502, the infusion system may create, for each of a plurality of reference samples (e.g., N reference samples), a reference feature vector with preconditioned input data for m features. Just as the input feature vector described in FIG. 3 was five-dimensional as a result of there being five parameters, the reference feature vector may be m-dimensional as a result of m features. As an example, the m features may include, but are not limited to, an initial measurement of a physical force at the start of the reference infusion session, a current measurement of a physical force during periodic intervals of the reference infusion session, a long term change in the physical force, a short term change in the physical force, etc., as shown in marker 503.

At step 504, the infusion system may receive, for each of the N reference samples, a corresponding target value, y, indicating either a presence or an absence of an occlusion. Just as the target values in FIG. 4 indicated either a presence or an absence of an occlusion for the training dataset in FIG. 3, the target values, y, in step 504 may indicate whether each sample received in step 502 indicated a presence or an absence of an occlusion. The target value, y, may comprise of N values corresponding to the N reference samples. Given the binary nature of the indication (e.g., a presence or an absence of an occlusion), the target value may comprise, for example, −1 to indicate an absence of an occlusion or 1, to indicate a presence of an occlusion.

At step 506, the infusion system may initialize and/or regenerate a decision boundary (e.g., the decision boundary 100 of FIG. 1). When the training dataset is mapped, the infusion system may use the training method described in FIG. 5 to learn how to divide data points corresponding to those having an indication of an occlusion from those having an indication of no conclusion (e.g., via the decision boundary 100). In the process of learning, the infusion system may initially create a decision boundary that may not necessarily be the most optimal. Based on the decision boundary 100, the infusion system may determine support vectors, $x_i \leftarrow x_j$ for each of the reference samples, N, at step 508.

At step 510, a kernel function, $K(x_1, x_2)$ may be computed. In some embodiments, the infusion system may optimize Lagrange multipliers, e.g., to determining the optimal decision boundary.

At step 514, the infusion system may determine whether the decision boundary generated for the dataset is optimal (e.g., whether the decision boundary has the maximum margins from the binarily classified data points). If it is found that the decision boundary is not the most optimal, steps 506 through 514 may be repeated.

Otherwise, the trained support vector machine, with its learned parameters may be stored in step 516, e.g., in an electronic storage medium associated with the infusion system. For example, the previously discussed decision boundary vectors ω and b can be computed through the training method shown in FIG. 5. The stored parameters for the trained support vector machine, ω and b, can then be utilized during an application of the trained support vector machine during a new infusion session for real-time occlusion detection, as will be shown in FIG. 6.

Figure 6:
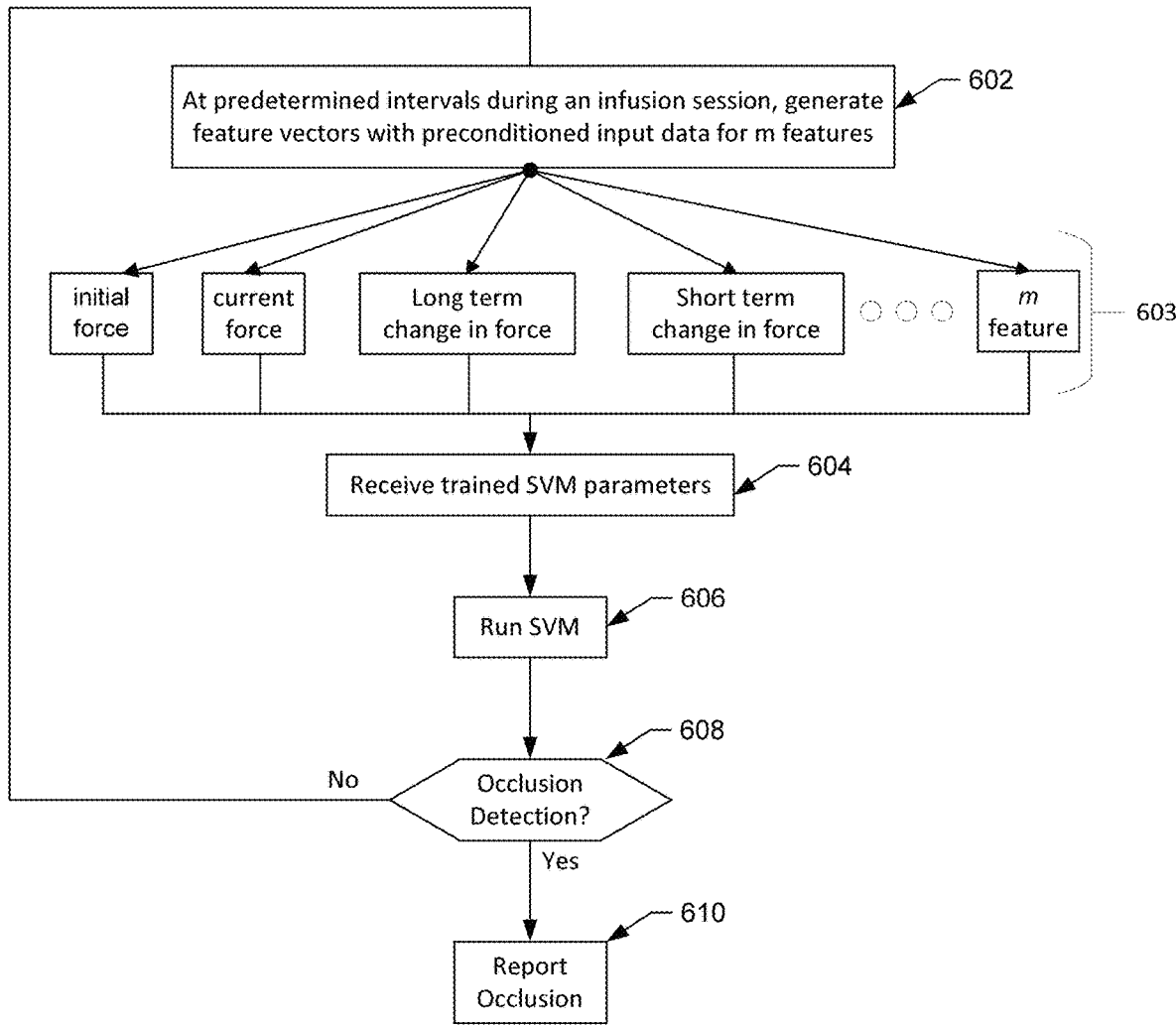
FIG. 6 is a flow chart illustrating a method for occlusion detection in infusion systems using a trained model, according to an embodiment of the present disclosure.

FIG. 6 is a flow chart illustrating a method for occlusion detection in infusion systems using a trained model, according to an embodiment of the present disclosure.

At step 602, the infusion system may generate, at predetermined intervals during an infusion session, feature vectors with preconditioned input data for m features. The m features may include, for example, an initial measurement of a physical force at the start of the reference infusion session, a current measurement of a physical force during periodic intervals of the reference infusion session, a long term change in the physical force, a short term change in the physical force, etc., as shown in marker 603.

At step 604, the infusion system may receive the trained support vector machine (e.g., the trained parameters, ω and b). In some embodiments, there may be a plurality of trained support vector machines stored externally, with each trained support vector machine corresponding to specific parameters that are unique to an infusion system. An appropriate trained support vector machine may be identified and its trained parameters retrieved, using the parameters unique to the infusion system. At step 606, the infusion system may run the support vector machine with its trained parameters, ω and b, using the feature vector formed during the specific time interval from step 602.

The support vector machine can thus detect in real-time, at step 608, whether there is an occlusion. If there is no indication of an occlusion, steps 602 through 608 may be repeated, e.g., based on preconditioned input data at the next time interval of the infusion session. Otherwise, at step 610, the infusion system may report the occlusion. For example, the infusion system may display an indication of the occlusion on a display device. Also or alternatively, the infusion system may terminate the infusion session upon detecting the occlusion.

Example Infusion System and Infusion Device

Figure 7:
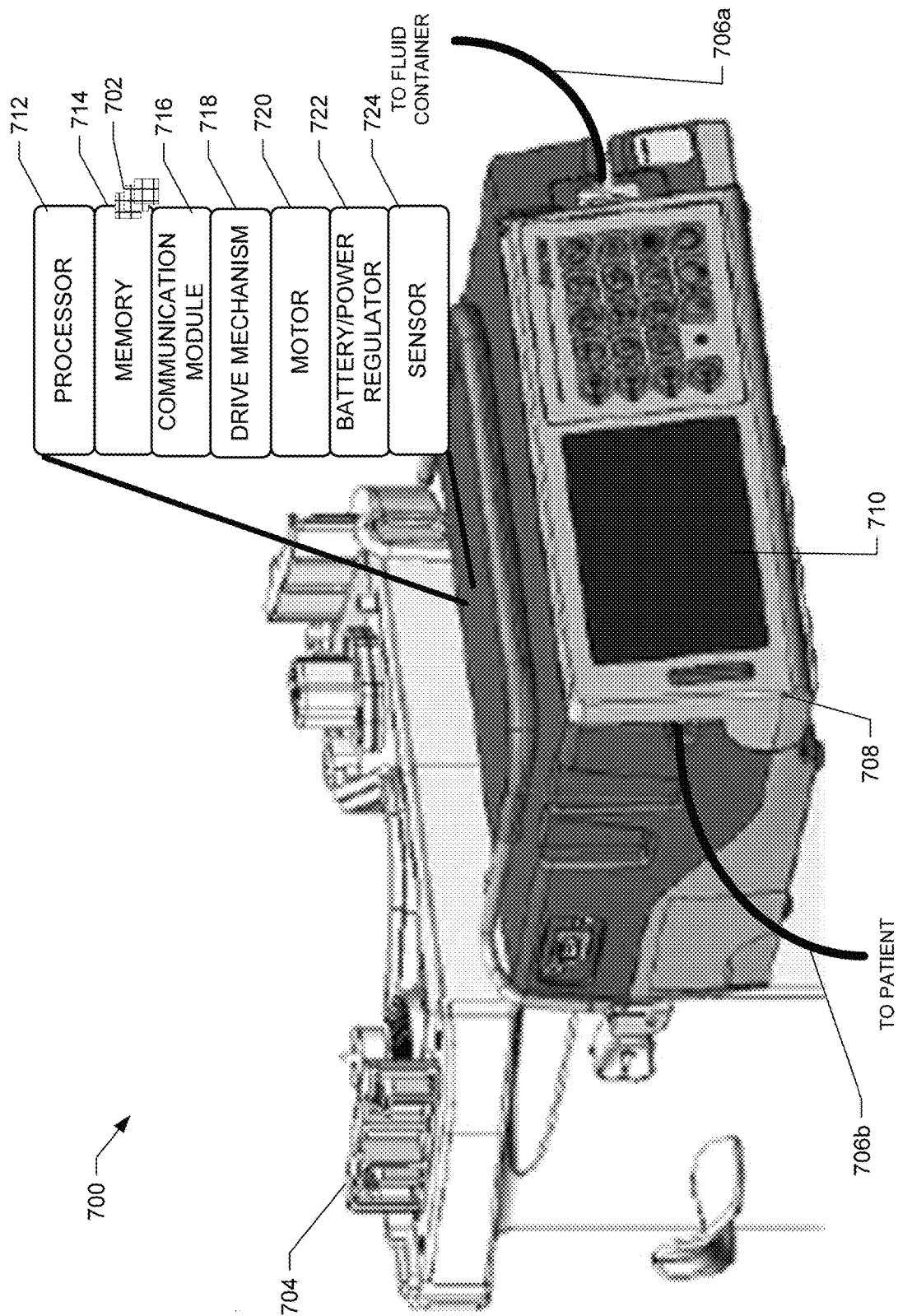
FIGS. 7 and 8 are diagrams of an infusion device that is configured to use a trained support vector machine to perform the method of FIG. 6, according to an example embodiment of the present disclosure.

FIG. 7 is a diagram of an infusion device 700 that is configured to use a trained support vector machine 702 to perform the method of FIG. 6, according to an example embodiment of the present disclosure. The infusion device 700 is an infusion pump, such as a syringe pump, an ambulatory pump, or a peristaltic pump. The infusion device 700 is connected to a rack 704 for support.

The infusion device 700 is configured to receive IV tubing 706. In an example, a cover 708 of the infusion device 700 opens, enabling the IV tubing 706 to be inserted. A first end of the IV tubing 706*a* is fluidly coupled to a fluid container that holds a drug, medication, or other fluid for an infusion treatment. A second end of the IV tubing 706*b* is fluidly coupled to a patient via an intravenous connection.

The infusion device 700 includes a user interface 710 for receiving operator inputs (e.g., a flow rate) such as the one or more parameters discussed above. The user interface 710 also displays information including a status of an infusion treatment and alarms/alerts indicative of an occlusion. The user interface 710 includes a touchscreen and a keypad. In other embodiments, the user interface 710 may include only a touchscreen or a keypad.

The infusion device 700 of FIG. 7 also includes a processor 712, a memory 714, and a communication module 716. While one processor 712 is shown, the infusion device 700 may include a plurality of processors. The processor 712 includes a controller, a logic device, etc. configured to execute the trained support vector machine 702 (e.g., an algorithm) stored in the memory 714. The processor 712 is also configured to execute one or more instructions stored in the memory 714 that, when executed by the processor 712, cause the processor 712 to perform the operations described herein to provide an infusion treatment. The memory 714 includes any memory device including read only memory, flash memory, random access memory, a hard disk drive, a solid state drive, etc.

The communication module 716 is configured for wireless and/or wired communication with a network, such as the Internet, a cellular network, and/or a local hospital network. The communication module 716 may be configured, for example, for Wi-Fi or Ethernet communication. In the illustrated example, the communication module 716 is configured to receive the trained support vector machine 702 (including trained parameters, ω and b) from a server or clinician computer via a network. In other examples, the processor 712 may perform the method of FIG. 5 to train the support vector machine 702. The communication module 716 may also receive the one or more parameters specifying an infusion treatment to be performed. Further, the communication module 716 may transmit alert or alarm messages to a server when an occlusion is detected.

The infusion device 700 of FIG. 7 further includes a drive mechanism 718, a motor 720, a battery/power regulator 722, and a sensor 724. Together, the drive mechanism 718 and the motor 720 comprise a pumping mechanism. The processor 712 is configured to transmit signals or commands to the motor 720, which cause the motor 720 to rotate or otherwise operate in a certain direction and speed. The movement or rotation of a drive shaft of the motor 720 causes the drive mechanism 718 to actuate or otherwise provide force on the IV tubing 706 (or a fluid container in alternative embodiments where a fluid container is placed inside the infusion device). The drive mechanism 718 may include finger actuators or a rotary actuator that apply pressure on the IV tubing 706 to deliver fluid from the fluid container to a patient for an infusion treatment. The drive mechanism 718 and the motor 720 are collectively configured to provide precise control of fluid delivery between 0.1 milliliters/hour up to 1000 milliliters/hour.

For a syringe pump, the drive mechanism 718 may include a piston or other actuator that pushes on a plunger of a syringe. In some embodiments, the motor 720 may rotate a drive screw, which causes the drive mechanism 718 to apply force on the plunger.

The battery/power regulator 722 is configured to provide electrical power for the infusion device 700. A power regulator converts outlet based AC power into DC power. A battery provides constant DC power.

Figure 8:
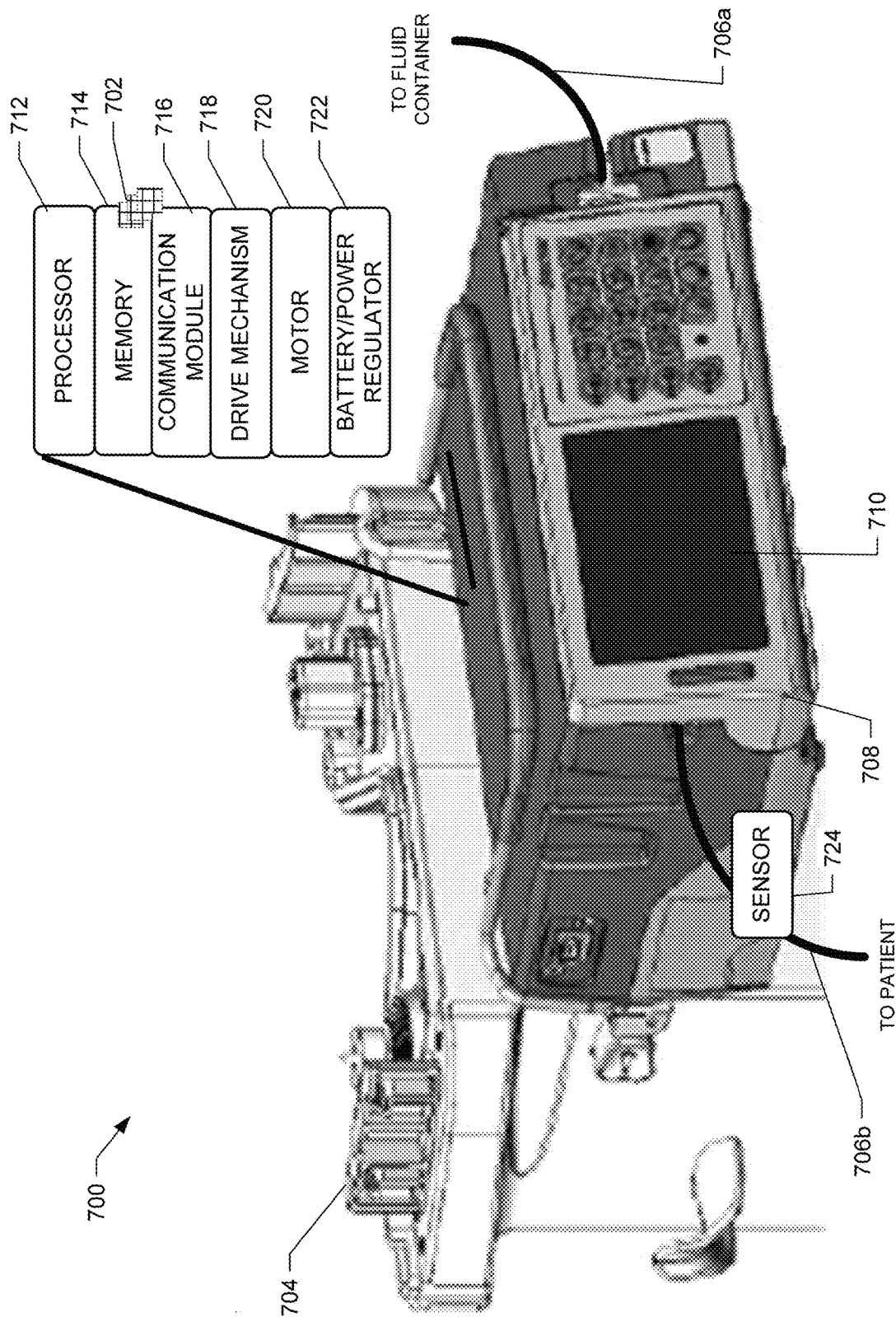

The force sensor 724 is configured to measure a pressure exerted by the IV tubing 706. The force sensor 724 may include a piezo-resistive sensor, a capacitance-based force sensor, a membrane sensor, a strain gauge, etc. In the illustrated example, the force sensor 724 is located within the infusion device 700. FIG. 8 shows an alternative embodiment where the force sensor 724 is located external to the infusion device 700. In these alternative embodiments, the force sensor 724 may be connected via a wire (e.g., a universal serial bus or a serial connection) to the infusion device 700. Alternatively, the force sensor 724 may be connected via a Bluetooth®, Zigbee®, or other wireless connection to the infusion device 700. In some embodiments, the force sensor 724 may include a pressure pod that is integrated with the IV tubing.

In some embodiments, the processor 712 of FIGS. 7 and 8 is configured to perform the method described in connection with FIG. 6. In these embodiments, the processor 712 receives measurements from the force sensor 724 of a physical force imparted by the IV tubing 706 that is caused by pumped fluid from the fluid container. The processor 712 selects the trained support vector machine 702 based on the programmed infusion treatment. The processor 712 then records sampled force or pressure measurements from the force sensor 724 and calculates slopes for long-term and short-term changes in the physical force within the IV tubing 706 (e.g., (A), (B), (C), and (D) discussed above). The processor 712 uses (A), (B), (C), and (D) to create a feature vector that is input into the selected trained support vector machine 702. The processor 712 then receives an output from the trained support vector machine 702 to indicate whether an occlusion is detected. When an occlusion is detected, the processor 712 may cause an alert and/or an alarm to be displayed on the user interface 710. Further, the processor 712 may also cause a message indicative of the occlusion to be transmitted to a network via the communication module 716. The processor 712 may perform the method described in connection with FIG. 6 for every new force measurement. Alternatively, the processor 712 may perform the method at programmed periodic intervals, such as every 50 milliseconds, 100 milliseconds, 500 milliseconds, 1 second, 2 seconds, etc.

Figure 9:
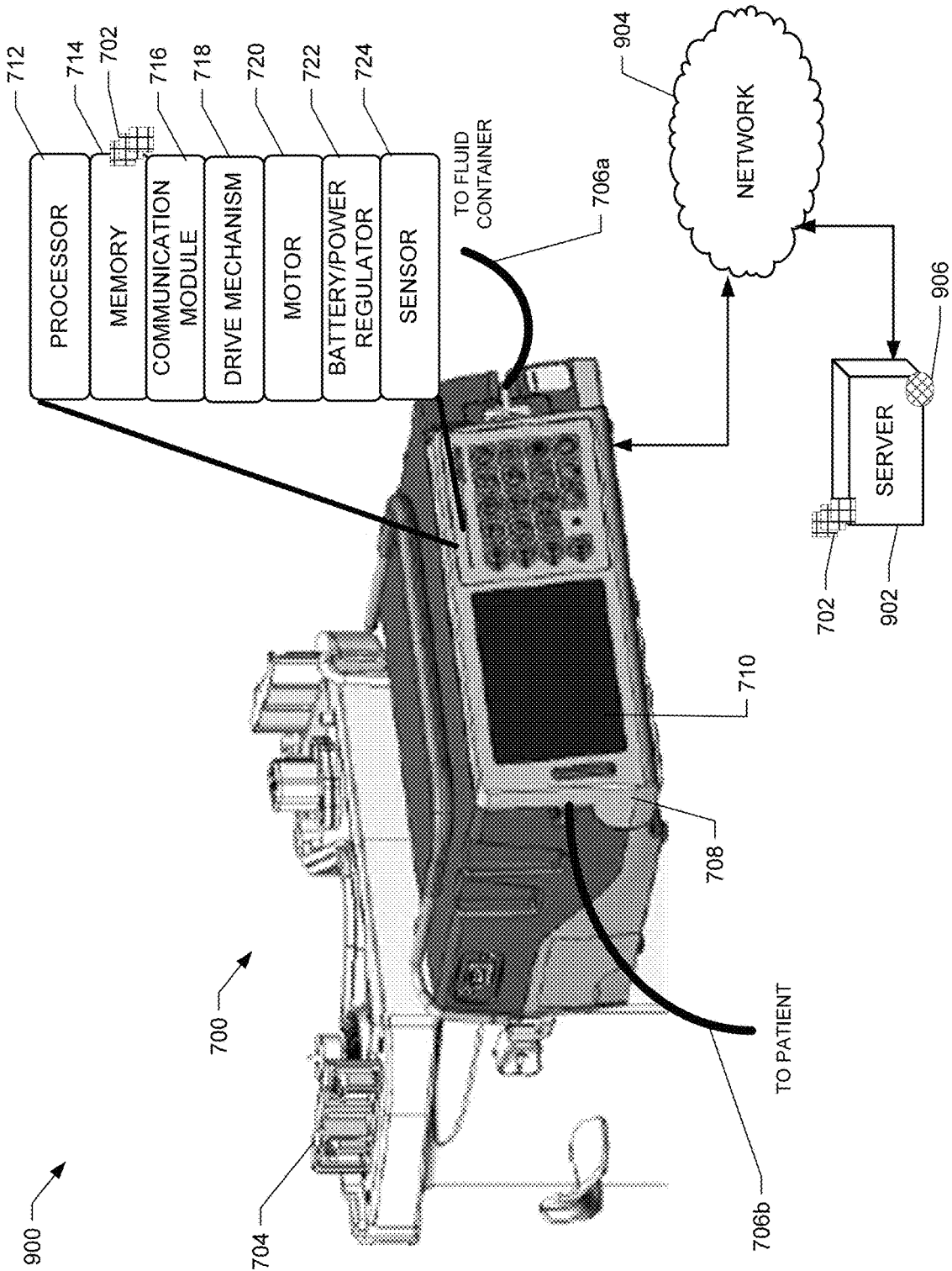
FIG. 9 is a diagram of an infusion system configured to perform the operations described in connection with FIG. 5, according to an example embodiment of the present disclosure.

FIG. 9 is a diagram of an infusion system 900 configured to perform the operations described in connection with FIG. 5, according to an example embodiment of the present disclosure. The infusion system 900 includes the infusion device 700 of FIGS. 7 and 8. The infusion system 900 also includes a server 902 that is connected to the infusion device 700 via a network 904, which may include any cellular, wide area, and/or local area network. The server 902 may be part of a heath information system and include a clinician computer.

In the illustrated example, the server 902 receives training data 906, such as the N reference samples discussed above. The training data 906 may be input into the server 902 from manually obtained data. Additionally or alternatively, the training data 906 may be received from one or more infusion devices including the infusion device 700.

As discussed above, the server 902 is configured to create one or more trained support vector machines 702 for specific parameters of infusion treatments using the training data 906. The server 902 may transmit the trained support vector machines 702 to the infusion device 700 via the network 904. Alternatively, the server 902 may receive one or more parameters (e.g., a flow rate) from the infusion device 700 before a treatment is to be begin. The server 902 selects the trained support vector machine 702 that matches or corresponds to the received infusion parameters and transmits the selected trained support vector machine 702 to the infusion device 700 for occlusion detection.

Conclusion

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An infusion pump apparatus for detecting an occlusion, the apparatus comprising:
   intravenous ("IV") tubing having a first end that is fluidly coupled to a patient and a second end that is fluidly coupled to a container;
   a pumping mechanism operable with a portion of the IV tubing for providing controlled delivery of a fluid from the container to the patient;
   a force sensor coupled to the IV tubing to measure a physical force caused by the fluid;
   one or more processors; and
   a memory storing instructions that, when executed by the one or more processors, cause the one or more processors to:
      receive, via the force sensor and during a start of an infusion session, an initial measurement of a physical force caused by fluid motion through the IV tubing,
      identify, based on one or more parameters associated with the infusion session, a trained support vector machine for occlusion detection;
      generate, during the infusion session at predetermined intervals, a feature vector comprising:
         the initial measurement of the physical force measured by the force sensor,
         a current measurement of the physical force measured by the force sensor,
         a long term change in the measurement of the physical force, and
         a short term change in the measurement of the physical force;
      input, during the infusion session at the predetermined intervals, the feature vector into the trained support vector machine to output a detection of a presence or an absence of an occlusion in the IV tubing; and
      when the presence of the occlusion is detected, pause or terminate the infusion session.

2. The apparatus of claim 1, wherein generating the feature vector further comprises:

receiving, via the force sensor, a current measurement of the physical force;

determining, based on a first prior measurement of the physical force, a long term change in the measurement of the physical force; and determining, based on a second prior measurement of the physical force, a short term change in the measurement of the physical force.

3. The apparatus of claim 1, wherein the instructions, when executed, further cause the one or more processors to train the support vector machine using a training dataset from a plurality of reference infusion sessions sharing the one or more parameters of the infusion session.

4. The apparatus of claim 3, wherein training the support vector machine further comprises:

receiving, for each of the plurality of reference infusion sessions:

one or more reference feature vectors corresponding to one or more times during the respective infusion session, wherein a given reference feature vector comprises:

a reference initial measurement of the physical force at the start of the respective reference infusion session, a reference current measurement of the physical force at a given time of the one or more times during the reference infusion session, a reference long term change in the measurement of the physical force, and a reference short term change in the measurement of the physical force, and an indication of a presence or an absence of an occlusion at the one or more times during the respective infusion session;

associating, for each of the plurality of reference infusion sessions, the one or more feature vectors with either the indication of the presence of the occlusion or the indication of the absence of the occlusion;

determining, based on an optimized margin, a decision boundary for the training dataset, wherein the decision boundary divides the reference feature vectors associated with the indication of the presence of the occlusion from the reference feature vectors associated with the indication of the absence of the occlusion; and generating, based on the decision boundary, the trained support vector machine.

5. The apparatus of claim 1, wherein the long term change in the measurement of the physical force includes a slope value represented by the current measurement of the physical force over a measurement of the physical force at a distant past.

6. The apparatus of claim 5, wherein the distant past includes one or more measurements of the physical force recorded at one to two minutes previously.

7. The apparatus of claim 1, wherein the long term change in the measurement of the physical force includes a slope value that is equal to the current measurement of the physical force minus a measurement of the physical force at a distant past, divided by a number of measurements recorded between the current measurement of the physical force and the measurement of the physical force at the distant past.

8. The apparatus of claim 7, wherein the distant past includes one or more measurements of the physical force recorded at one to two minutes previously.

9. The apparatus of claim 1, wherein the short term change in the measurement of the physical force includes a slope value represented by the current measurement of the physical force over a measurement of the physical force at a near past.

10. The apparatus of claim 9, wherein the near past includes one or more measurements of the physical force recorded at 50 milliseconds to 100 milliseconds previously.

11. The apparatus of claim 1, wherein the short term change in the measurement of the physical force includes a slope value that is equal to the current measurement of the physical force minus a measurement of the physical force at a near past, divided by a number of measurements recorded between the current measurement of the physical force and the measurement of the physical force at the near past.

12. The apparatus of claim 11, wherein the near past includes one or more measurements of the physical force recorded at 50 milliseconds to 100 milliseconds previously.

13. The apparatus of claim 1, wherein the one or more processors are configured to cause an alert or an alarm to be displayed on a user interface when the presence of the occlusion is detected.

14. An infusion system for detecting an occlusion, the system comprising:

a force sensor coupled to IV tubing to measure a physical force caused by a fluid within the IV tubing, the IV tubing having a first end that is fluidly coupled to a patient and a second end that is fluidly coupled to a container; and an infusion device communicatively coupled to the force sensor, the infusion device including:

a pumping mechanism operable with a portion of the IV tubing for providing controlled delivery of a fluid from the container to the patient, a user interface, one or more processors, and a memory storing a plurality of trained support vector machines and instructions that, when executed by the one or more processors, cause the one or more processors to:

receive, via the force sensor and during a start of an infusion session, an initial measurement of a physical force caused by fluid motion through the IV tubing, identify, based on one or more parameters associated with the infusion session, a trained support vector machine for occlusion detection among the plurality of the trained support vector machines;

generate, during the infusion session at predetermined intervals, a feature vector comprising:

the initial measurement of the physical force measured by the force sensor, a current measurement of the physical force measured by the force sensor, a long term change in the measurement of the physical force, and a short term change in the measurement of the physical force;

input, during the infusion session at the predetermined intervals, the feature vector into the trained support vector machine to output a detection of a presence or an absence of an occlusion in the IV tubing; and when the presence of the occlusion is detected, cause an alert or an alarm to be displayed on the user interface that is indicative of the occlusion;

wherein the instructions, when executed, further cause the one or more processors to train the support vector machine using a training dataset from a plurality of reference infusion sessions sharing the one or more parameters of the infusion session, wherein the training the support vector machine further comprises:

receiving, for each of the plurality of reference infusion sessions:
- one or more reference feature vectors corresponding to one or more times during the respective infusion session, wherein a given reference feature vector comprises:
  - a reference initial measurement of the physical force at the start of the respective reference infusion session,
  - a reference current measurement of the physical force at a given time of the one or more times during the reference infusion session,
  - a reference long term change in the measurement of the physical force, and
  - a reference short term change in the measurement of the physical force, and
- an indication of a presence or an absence of an occlusion at the one or more times during the respective infusion session;

associating, for each of the plurality of reference infusion sessions, the one or more feature vectors with either the indication of the presence of the occlusion or the indication of the absence of the occlusion;

determining, based on an optimized margin, a decision boundary for the training dataset, wherein the decision boundary divides the reference feature vectors associated with the indication of the presence of the occlusion from the reference feature vectors associated with the indication of the absence of the occlusion; and generating, based on the decision boundary, the trained support vector machine.

15. The system of claim 14, wherein the one or more processors are configured to pause or terminate the infusion session when the presence of the occlusion is detected.

16. The system of claim 14, wherein the force sensor is integrally formed or fluidly connected to the IV tubing.

17. The system of claim 14, wherein generating the feature vector further comprises:
- receiving, via the force sensor, a current measurement of the physical force;
- determining, based on a first prior measurement of the physical force, a long term change in the measurement of the physical force; and
- determining, based on a second prior measurement of the physical force, a short term change in the measurement of the physical force.

18. An infusion pump method for detecting an occlusion, the method comprising:
- receiving, in a processor of an infusion device from a force sensor and during a start of an infusion session, an initial measurement of a physical force caused by fluid motion through IV tubing having a first end that is fluidly coupled to a patient and a second end that is fluidly coupled to a container;
- identifying, via the processor based on one or more parameters associated with the infusion session, a trained support vector machine for occlusion detection;
- generating, via the processor during the infusion session at predetermined intervals, a feature vector comprising:
  - the initial measurement of the physical force measured by the force sensor,
  - a current measurement of the physical force measured by the force sensor,
  - a long term change in the measurement of the physical force, and
  - a short term change in the measurement of the physical force;
- inputting, via the processor during the infusion session at the predetermined intervals, the feature vector into the trained support vector machine to output a detection of a presence or an absence of an occlusion in the IV tubing; and
- when the presence of the occlusion is detected, pausing or terminating the infusion session via the processor.

* * * * *